United States Patent
Enners

(10) Patent No.: US 6,659,274 B2
(45) Date of Patent: Dec. 9, 2003

(54) WATERPROOF CASING FOR HEWLETT-PACKARD JORNADA PORTABLE PERSONAL COMPUTER

(75) Inventor: Ryan S. Enners, Starksboro, VT (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 58 days.

(21) Appl. No.: 10/023,042

(22) Filed: Dec. 14, 2001

(65) Prior Publication Data

US 2003/0111366 A1 Jun. 19, 2003

(51) Int. Cl.7 .............................................. B65D 85/38
(52) U.S. Cl. ..................... 206/305; 206/811; 206/320
(58) Field of Search ............................... 206/305, 320, 206/811, 576; 220/803, 804, 849, 377, 789, 795, 378, 4.21, 6.62; 150/154, 165

(56) References Cited

U.S. PATENT DOCUMENTS

| 4,465,189 A | * | 8/1984 | Molzan ................. 206/524.8 |
| 4,963,693 A | | 10/1990 | Kodl ..................... 174/11 R |
| 5,080,155 A | | 1/1992 | Crozier ................... 150/154 |
| 5,092,459 A | | 3/1992 | Uljanic et al. ............. 206/320 |
| 5,201,867 A | * | 4/1993 | Morszeck ................ 206/316.2 |
| 5,388,691 A | * | 2/1995 | White .................... 206/305 |
| 5,499,713 A | * | 3/1996 | Huffer ................... 206/320 |
| 5,511,390 A | * | 4/1996 | Mah ...................... 63/1.14 |
| 5,713,466 A | * | 2/1998 | Tajima ................... 206/320 |
| 5,931,297 A | | 8/1999 | Weill et al. .............. 206/320 |
| 5,957,831 A | | 9/1999 | Adair .................... 600/101 |
| 6,068,119 A | * | 5/2000 | Derr et al. ............... 206/305 |
| 6,082,535 A | | 7/2000 | Mitchell ................. 206/320 |
| 6,092,707 A | * | 7/2000 | Bowes, Jr. ............... 224/435 |
| 6,132,367 A | | 10/2000 | Adair .................... 60/101 |

FOREIGN PATENT DOCUMENTS

WO   WO 200051315   *   8/2000

* cited by examiner

Primary Examiner—Jila M. Mohandesi

(57) ABSTRACT

Waterproof casings for use with a portable handheld computer, such as a HP Jornada™ portable handheld computer, for example. The waterproof casings comprise a separable plastic casing having a watertight rubber seal. The plastic casings are compact, light and durable with a clear rubber screen protector, allowing a touch point screen of the portable handheld computer to be operable. The portable handheld computer is placed inside the waterproof case which is latched closed to create a watertight container. The plastic casing is preferably designed to be waterproof up to a depth of about 100 feet. The present invention allows the use and protection of a HP Jornada portable handheld computer in many environments including protecting it from the possibility of water damage.

15 Claims, 3 Drawing Sheets

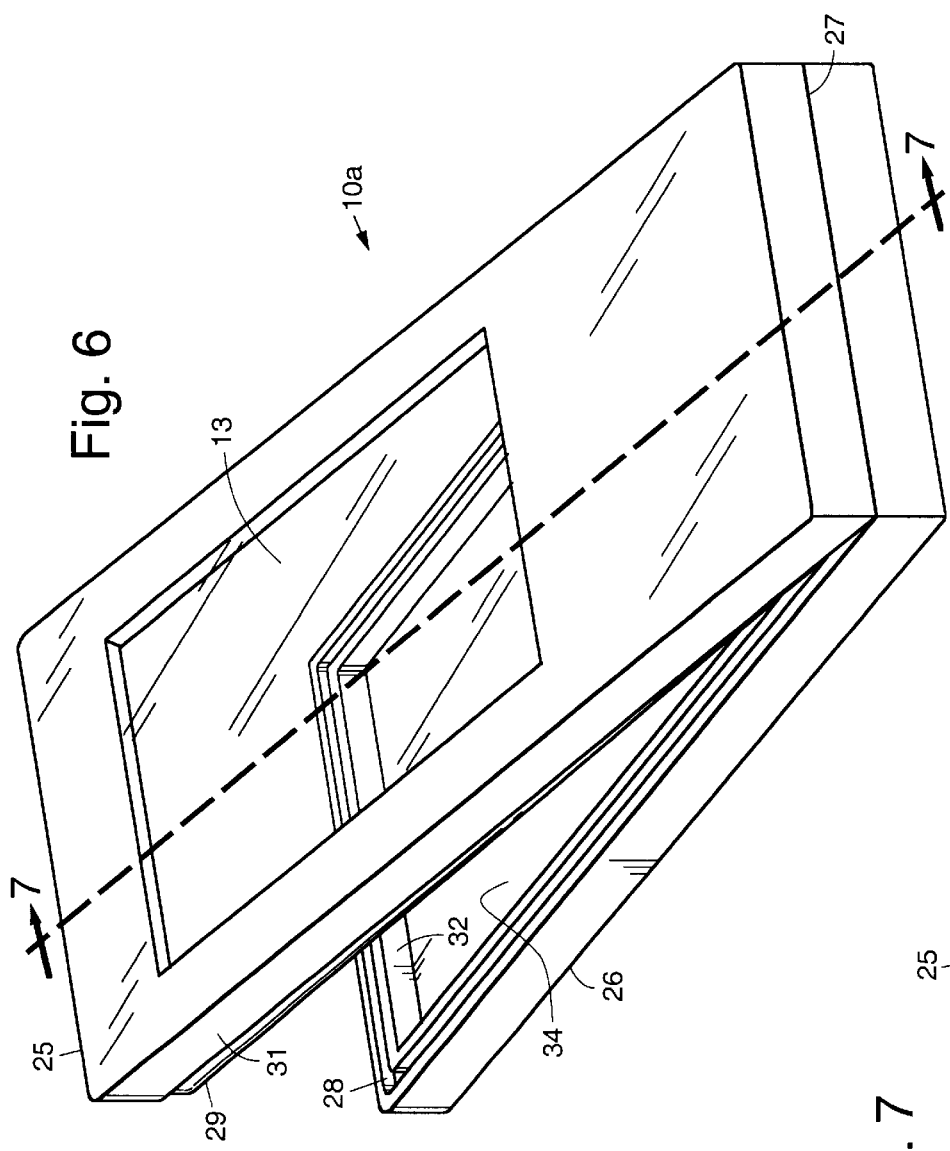
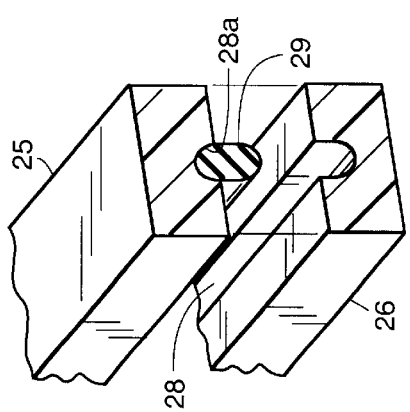
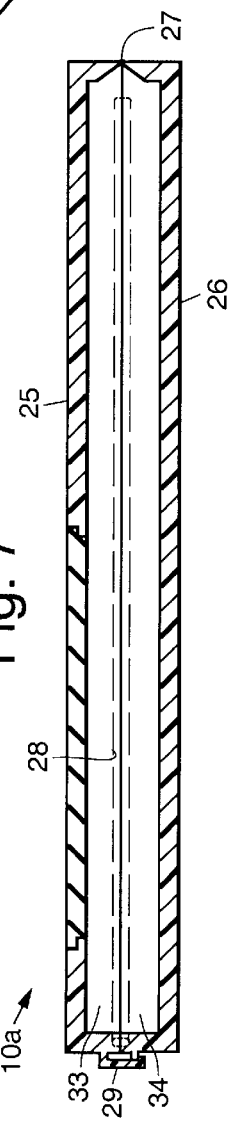

WATERPROOF CASING FOR HEWLETT-PACKARD JORNADA PORTABLE PERSONAL COMPUTER

BACKGROUND

The present invention relates generally to music-related systems, and more specifically, to waterproof casings for use with a portable handheld computer, and particularly a HP Jornada™ portable computer.

The assignee of the present invention manufactures a handheld personal computer (PC) or pocket PC device known as HP Jornada™. The HP Jornada™ is a handheld PC that delivers the power, speed, and flexibility you need while on the go. Packed with memory, they let you run the applications you need, as well as send and receive e-mail and use the Internet to do business away from the office.

Currently, there are no durable water tight containers for the HP Jornada that allow the protection of the Jornada as well as providing the user with full functionality of the Jornada.

Typical watertight containers enclose the Jornada, but require a user to pull the device out of the container, exposing it to the elements and possible damage. This poses a great risk of damage to the Jornada every time the device is used.

A search regarding the present invention was performed in the US Patent and Trademark Office and uncovered the following US patents: U.S. Pat. No. 6,132,367, U.S. Pat. No. 5,957,831, U.S. Pat. No. 4,963,693, U.S. Pat. No. 5,080,155, U.S. Pat. No. 6,082,535, U.S. Pat. No. 5,931,297, and U.S. Pat. No. 5,092,459.

U.S. Pat. No. 6,132,367 discloses that "A sterile enclosure is provided having a body portion for encapsulating one or more video monitors used for viewing one or more surgical areas in a sterile operating field. The enclosure may be flexible or rigid and have one or more cable drapes extending from the body to cover one or more cables associated with the video monitor. In some embodiments, the body is flexible. In another embodiment, the body is rigid. The body is transparent in at least an area for viewing the screen of the video monitor and is substantially impervious to liquid and gas. A vacuum line may be connected to the body portion to evacuate air therefrom."

U.S. Pat. No. 5,957,831 discloses that "A sterile enclosure is provided having a body portion for encapsulating one or more video monitors used for viewing one or more surgical areas in a sterile operating field. The enclosure may be flexible or rigid and have one or more cable drapes extending from the body to cover one or more cables associated with the video monitor. In some embodiments, the body is flexible. In another embodiment, the body is rigid. The body is transparent in at least an area for viewing the screen of the video monitor and is substantially impervious to liquid and gas. A vacuum line may be connected to the body portion to evacuate air therefrom. An air vent filter may be used in conjunction with the vacuum line to allow air to flow through the sterile enclosure thus cooling the video monitor therein."

U.S. Pat. No. 4,963,693 discloses that "A protective or purge enclosure provides a positive atmosphere around an operating device such as a hand-held computer or calculator contained therein. The protective enclosure has sufficient flexibility, even though providing a positive, sealed atmosphere, to enable the user to operate the functional features of the device sealed within the enclosure, and the material forming the device is sufficiently transparent to enable the user to view the functional features of the device for operation. A visible indicator provided on the enclosure enables the user to determine if the enclosure is maintaining the positive atmosphere sealed therein."

U.S. Pat. No. 5,080,155 discloses that "A bag-like envelope is sized to receive a keyboard. The envelope has a reclosable and resealable opening for receiving the keyboard and another sealable opening for the electrical cable from the keyboard. A transparent panel of the envelope overlies the keys on one face of the keyboard. Air is evacuated from the interior of the envelope to cause the transparent panel to be drawn down onto the keys on the keyboard."

U.S. Pat. No. 6,082,535 discloses that "A protective covering for a communications device includes a resilient water-impermeable bag which is of one piece. The bag has a single opening through which the communications device can be inserted in the bag, and a layer of adhesive runs around the opening on the inside of the bag. The adhesive layer is covered by a nonadhesive strip which can be peeled off to expose the adhesive layer. When the bag is closed following removal of the nonadhesive strip, the adhesive layer forms a water-impermeable seal for the opening of the bag."

U.S. Pat. No. 5,931,297 discloses "A glove-like protective cover capable of encasing a notebook computer, thereby allowing it to be used in a hostile operating environment, such as outdoors or at a manufacturing site, without risk of debris and moisture reaching the computer and detrimentally affecting its performance. The protective cover includes a top pocket capable of having the screen section of the notebook computer inserted therein, and a bottom pocket capable of having the keyboard section of the computer inserted therein. In this way, the notebook computer can be placed in its open, operating position while encased in the protective cover. The portions of the cover overlying the screen and keyboard sections of the computer are transparent. Thus, an operator is able to see the screen and keyboard of the notebook computer through the protective cover. Further, the portion of the cover overlying the keyboard of the computer is flexible so as to allow the keyboard to be operated through the cover. The protective cover may also employ a shock absorbing apparatus capable of protecting the notebook computer from damage caused by impacts with other objects during transit or while in use."

U.S. Pat. No. 5,092,459 discloses "A transparent plastic case for encapsulation of a remote control unit having pushbuttons on its upper face, such that spilled liquid beverages cannot reach the pushbuttons to adversely affect operation of the control unit. The plastic case is openable to permit easy insertion of the control unit into the case."

Accordingly, it is an objective of the present invention to provide for improved waterproof casings for use with a portable handheld computer. It is also an objective of the present invention to provide for improved waterproof casings for use a HP Jornada™ portable computer.

SUMMARY OF THE INVENTION

To accomplish the above and other objectives, the present invention provides for waterproof casings that may be used with a portable handheld computer, such as a HP Jornada™ portable handheld computer, for example. Latching clamshell and sliding versions of the waterproof casings are provided.

Each waterproof casing is made of plastic and has a watertight rubber seal to protect the portable computer from the environment. Each waterproof casing also has a clear rubber screen that permit a touch point screen of the portable handheld computer to be operated.

In the sliding embodiment, a first portion of the casing has a deep pocket or cavity into which the portable handheld computer is inserted. The first portion of the casing comprises the clear rubber screen for viewing and operating the touch point screen of the portable handheld computer. A second portion of the casing comprises a T-shaped cover having a groove therein that receives a watertight rubber seal, which may be in the form of a rectangular-shaped O-ring. An internal surface of the first portion has a groove that receives the watertight rubber seal when the second portion of the casing or cover is inserted into the first portion of the casing. A locking mechanism may be provided to secure the first and second portions of the casing together when the waterproof casing is closed.

In the latching clamshell embodiment, upper and lower portions of the casing are attached by a hinge, such as a living hinge, for example. The upper portion of the casing comprises the clear rubber screen for viewing and operating the touch point screen of the portable handheld computer. The upper and lower portions of the casing have grooves formed in abutting surfaces thereof. The watertight rubber seal is secured in one of the grooves, and engages the other of the grooves when the upper and lower portions of the casing are closed. A latching mechanism secures the upper and lower portions together to seal the waterproof casing.

The portable handheld computer is placed inside the waterproof case which is latched closed to create a watertight container. The plastic casing is preferably designed to be waterproof up to a depth of about 100 feet. The present invention allows the use and protection of a HP Jornada portable handheld computer in many environments, including protecting it from the possibility of water damage. The plastic casings are compact, light and durable and comprise a clear rubber screen protector, allowing a touch point screen of the portable handheld computer to be operable.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIGS. 6–8 illustrate various views of a second exemplary embodiment of a waterproof casing in accordance with the principles of the present invention.

DETAILED DESCRIPTION

Figure 2:
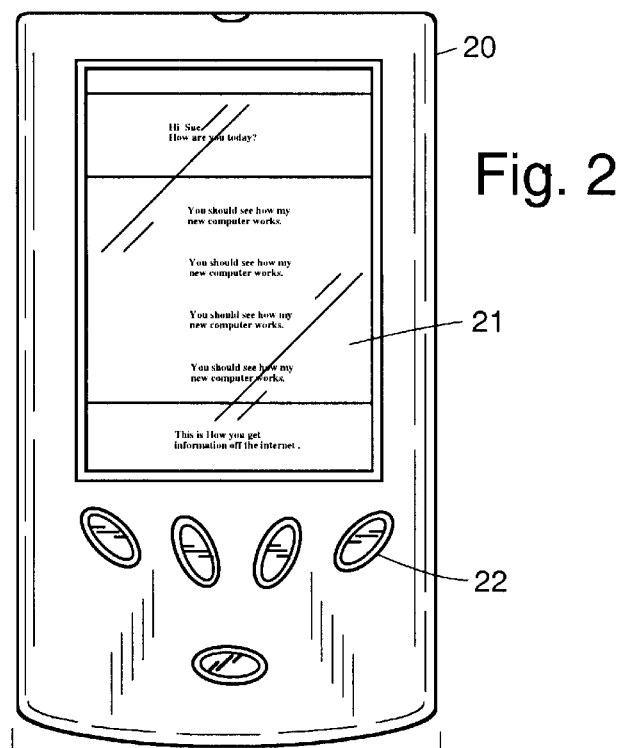
FIGS. 1–5 illustrate various views of a first exemplary embodiment of a waterproof casing in accordance with the principles of the present invention.

Referring to the drawing figures, FIGS. 1–5 illustrate various views of a first exemplary embodiment of a waterproof casing 10 in accordance with the principles of the present invention for use with a portable handheld computer 20, such as a HP Jornada™ portable handheld computer 20, for example. FIGS. 1–5 illustrate a sliding version of the waterproof casing 10.

Figure 1:
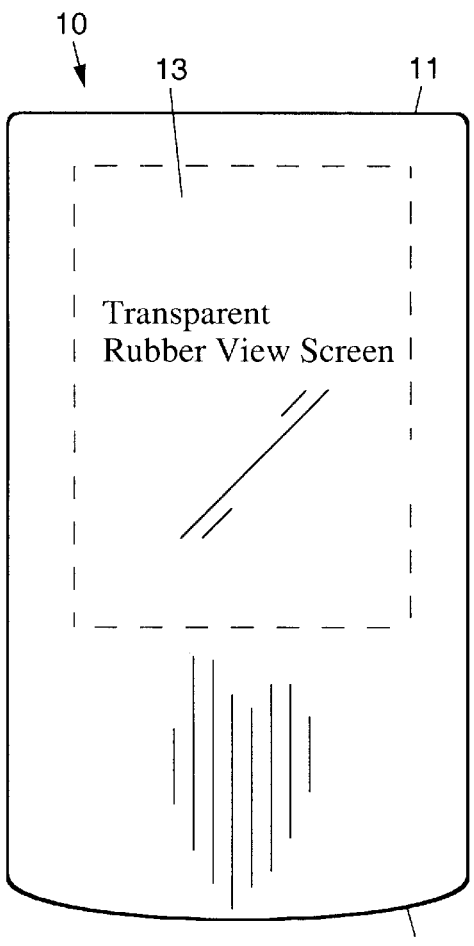

The waterproof casing 10 shown in FIG. 1 comprises a plastic case 11 having a thin substantially transparent screen 13 formed therein. The substantially transparent screen 13 may be made of rubber, for example, or may be made of plastic that is flexible. The bottom edge of the plastic case 11 is preferably curved or contoured to match the shape of the HP Jornada portable handheld computer 20. However, it is to be understood that the case 11 need not be curved or contoured, as is illustrated in other of the drawing figures.

FIG. 2 illustrates an exemplary HP Jornada portable handheld computer 20. The HP Jornada portable handheld computer 20 is rectangular in shape and has a touch point screen 21 that is depressed by a user to operate the computer 20. The HP Jornada portable handheld computer 20 also has a plurality of depressible buttons 22 that are operable to turn it on, and perform various functions.

Figure 3:
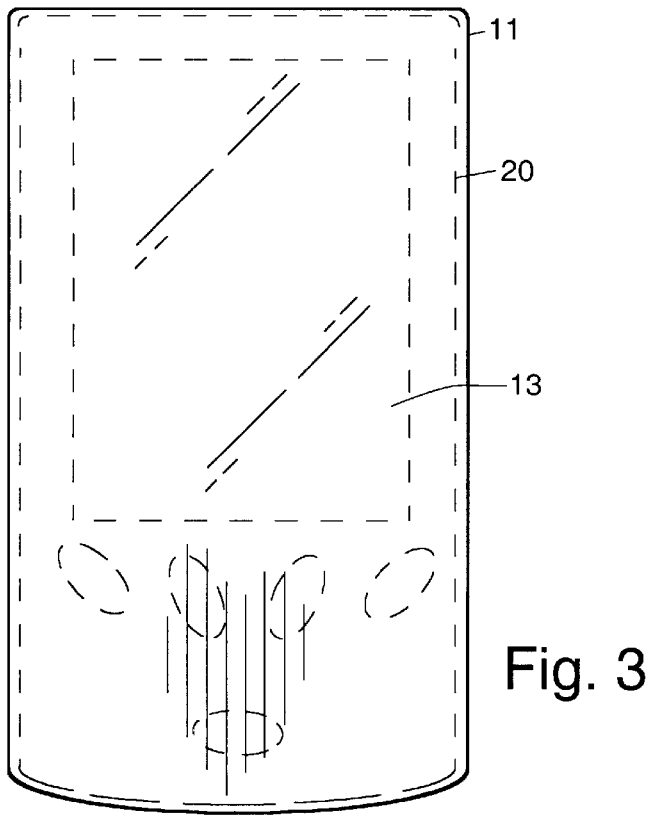

The HP Jornada portable handheld computer 20 shown in FIG. 2 is slid into the waterproof casing 10 as is illustrated in FIG. 3. The dashed lines shown in FIG. 3 illustrate the HP Jornada portable handheld computer 20 residing within the casing 10, and shows locations of the touch point screen 21 and the plurality of depressible buttons 22.

Figure 4:
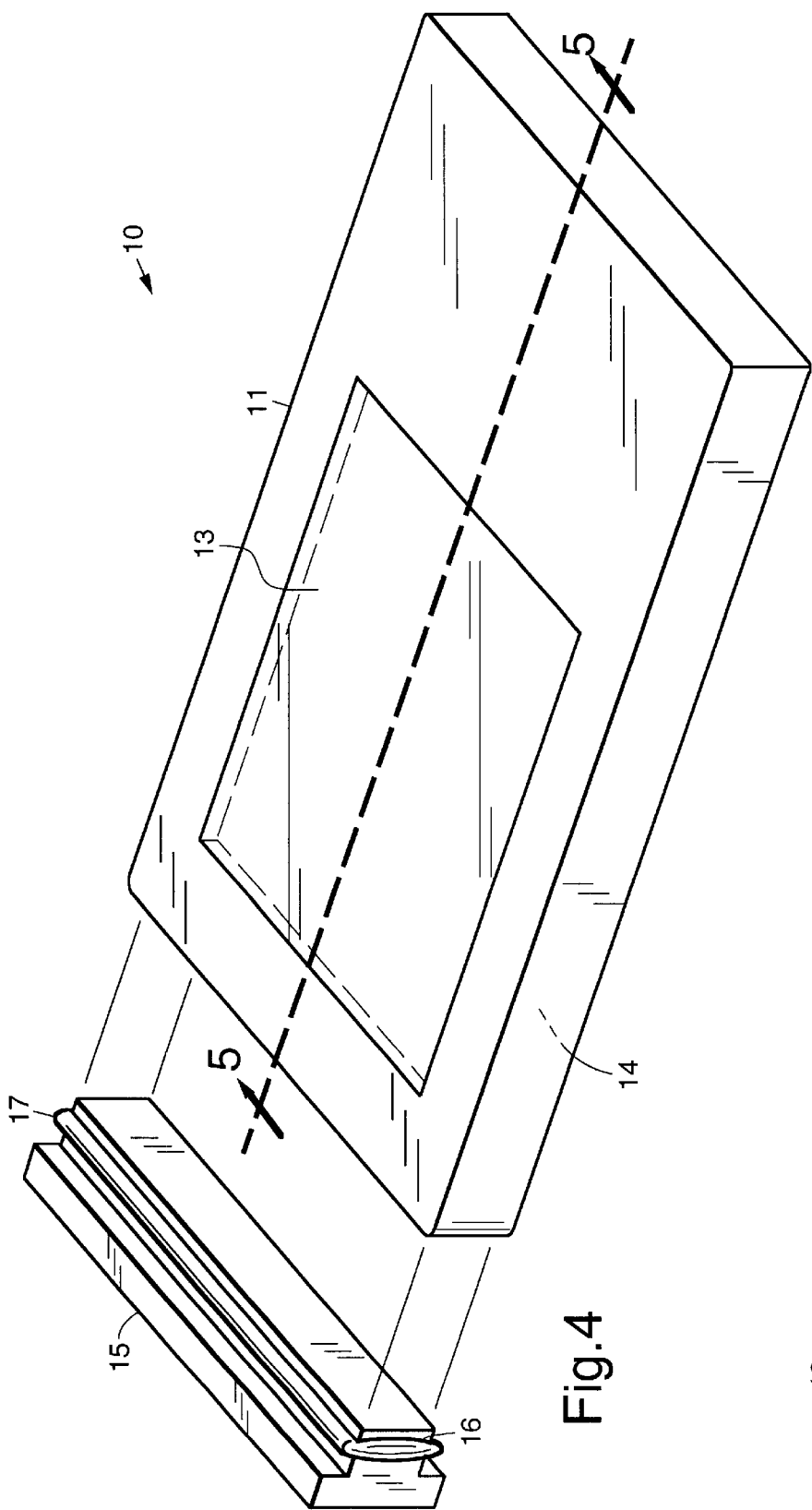
Figure 5:
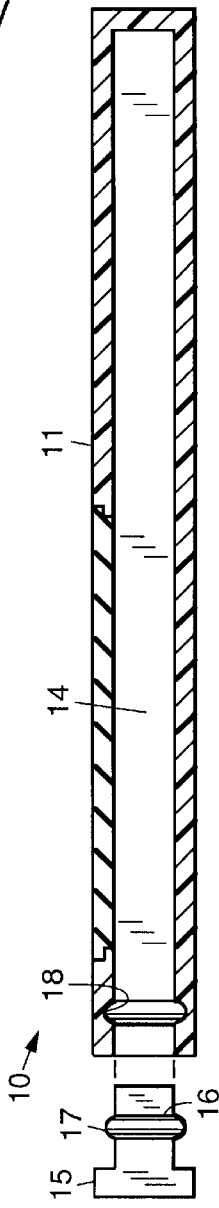

FIG. 4 is a perspective view showing details of the sliding version of the waterproof casing 10. FIG. 5 is a cross sectional side view of the waterproof casing 10, taken along the line 5—5 in FIG. 4.

The sliding version of the waterproof casing 10 comprises a first portion 11 that has a deep pocket 14 or cavity 14 into which the portable handheld computer 20 is inserted. The first portion 11 comprises a clear rubber screen 13 that allows viewing and operating of the touch point screen 21 of the portable handheld computer 20. An internal surface of the first portion 11 has a continuous peripheral groove 18 that receives a watertight rubber seal 17 when the second portion 15 of the casing 10 (or cover 15) is inserted into the first portion 11 of the casing 10.

A second portion 15 of the casing comprises a T-shaped cover 15. The second portion 15 or T-shaped cover 15 has a groove 16 formed in a portion thereof that is inserted into the first portion 11. The groove 16 has the watertight rubber seal 17 disposed therein, which may be adhesively secured in the groove 16. The watertight rubber seal 17 may be in the form of a rectangular-shaped O-ring 17.

When the second portion 15 or T-shaped cover 15 is inserted into the first portion 11, the watertight rubber seal 17 is pressed into the groove 18 of the first portion 11, sealing the waterproof casing 10. The action of the watertight rubber seal 17 inserting into the groove 18 of the first portion 11 operates to lock the waterproof casing 10. Alternatively, a locking mechanism (not shown) may be provided to secure the first and second portions 11, 15 of the casing 10 together when they are pressed together to close waterproof casing 10.

FIGS. 6–8 illustrate various views of a second exemplary embodiment of a waterproof casing 10a in accordance with the principles of the present invention for use with a portable handheld computer 20, such as the HP Jornada™ portable handheld computer 20, for example. FIGS. 6–8 illustrate a latching clamshell version of the waterproof casing 10a.

The latching clamshell embodiment of the waterproof casing 10a comprises upper and lower portions 25, 26 that are attached by a hinge 27, such as a living hinge 27, for example. The upper and lower portions 25, 26 of the waterproof casing 10a preferably comprise plastic. The upper portion 25 of the casing 10a comprises a clear rubber screen 13 for viewing and operating the touch point screen 21 of the portable handheld computer 20.

The upper portion 25 of the casing 10a has a peripheral edgewall 31 that forms an upper cavity 33. The lower portion 26 of the casing 10a also has a peripheral edgewall 32 that forms an lower cavity 34.

The upper and lower portions 25, 26 of the casing 10a have grooves 28, 28a formed in abutting surfaces thereof. A watertight rubber seal 29 is secured in one of the grooves 28a, and engages the other groove 28 when the upper and lower portions of the casing are closed. A latching mechanism 29 secures the upper and lower portions 25, 26 together to seal the waterproof casing 10a.

Thus, waterproof casings for use with a portable handheld computer, and particularly a HP Jornada™ portable computer have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A waterproof casing for use with a portable handheld computer, comprising:

a first portion that has a cavity into which the portable handheld computer is inserted;

a thin substantially transparent screen formed in the first portion that permits operation of a touch point screen of the portable handheld computer;

an inner continuous peripheral groove formed in an internal surface of the first portion;

a second portion that mates with the first portion and that comprises an outer peripheral groove formed around a peripheral edge thereof;

a watertight rubber seal disposed in the groove of the second portion, which seal is captivated by the inner continuous peripheral groove formed in the first portion when the second portion is inserted into the first portion to seal the waterproof casing.

2. The waterproof casing recited in claim 1 wherein the substantially transparent screen comprises rubber.

3. The waterproof casing recited in claim 1 wherein the substantially transparent screen comprises flexible plastic.

4. The waterproof casing recited in claim 1 wherein the cavity is contoured to match the shape of the handheld computer.

5. The waterproof casing recited in claim 1 wherein the substantially transparent screen comprises a clear rubber screen that allows viewing and operating of a touch point screen of the portable handheld computer.

6. The waterproof casing recited in claim 1 wherein the second portion of the casing comprises a T-shaped cover.

7. The waterproof casing recited in claim 1 wherein the watertight rubber seal locks the waterproof casing.

8. The waterproof casing recited in claim 1 wherein the watertight rubber seal is adhesively secured in the groove.

9. The waterproof casing recited in claim 1 further comprising a locking mechanism for securing the first and second portions of the casing together.

10. A waterproof casing for use with a portable handheld computer, comprising:

an upper portion having an edgewall that forms an upper cavity, and comprising a thin substantially transparent screen that permits operation of a touch point screen of the portable handheld computer;

a lower portion having an edgewall that forms a lower cavity that cooperates with the upper cavity to house the portable handheld computer when the upper and lower portions are closed together;

a hinge that attaches the upper and lower portions;

upper and lower grooves formed in abutting surfaces of the upper and lower portions;

a watertight rubber seal secured in one of the grooves that engages the other groove when the upper and lower portions of the casing are closed; and a latching mechanism for securing the upper and lower portions together to seal the waterproof casing.

11. The waterproof casing recited in claim 10 wherein the substantially transparent screen comprises rubber.

12. The waterproof casing recited in claim 10 wherein the substantially transparent screen comprises flexible plastic.

13. The waterproof casing recited in claim 10 wherein the cavity is contoured to match the shape of the handheld computer.

14. The waterproof casing recited in claim 10 wherein the hinge comprises a living hinge.

15. The waterproof casing recited in claim 10 wherein the upper and lower portions of the waterproof casing comprise plastic.

* * * * *